US007600959B2

(12) United States Patent
Neubauer et al.

(10) Patent No.: US 7,600,959 B2
(45) Date of Patent: Oct. 13, 2009

(54) PANEL INSTALLATION APPARATUS AND METHOD

(75) Inventors: Mark G. Neubauer, Hagerstown, MD (US); Ignacy Puszkiewicz, Smithsburg, MD (US)

(73) Assignee: JLG Industries, Inc., McConnellsbury, PA (US)

( * ) Notice: Subject to any disclaimer, the term of this patent is extended or adjusted under 35 U.S.C. 154(b) by 282 days.

(21) Appl. No.: 10/834,103

(22) Filed: Apr. 29, 2004

(65) Prior Publication Data

US 2004/0218997 A1 Nov. 4, 2004

Related U.S. Application Data

(60) Provisional application No. 60/466,425, filed on Apr. 30, 2003.

(51) Int. Cl.
*E04G 21/14* (2006.01)
*B65G 47/91* (2006.01)
*B25J 9/10* (2006.01)

(52) U.S. Cl. ......................... 414/11; 414/627; 414/590; 414/783; 901/40

(58) Field of Classification Search ................... 414/10, 414/11, 627, 680, 783, 752.1, 743, 793, 797, 414/607, 639; 901/8, 14, 16; 72/404, 405.1, 72/405.11, 405.14, 405.16; 269/910; 182/145; 52/122.1

See application file for complete search history.

(56) References Cited

U.S. PATENT DOCUMENTS 3,361,280 A 1/1968 Traver
3,409,158 A * 11/1968 Le ............................ 414/639
3,791,094 A * 2/1974 Shannon, Jr. ............... 52/747.1
3,809,180 A * 5/1974 Grove ........................ 182/2.2
4,117,939 A * 10/1978 Haddock ..................... 414/11
4,676,713 A 6/1987 Voelpel
4,682,926 A * 7/1987 Chambers et al. ............. 414/11
4,863,340 A * 9/1989 Masunaga et al. ........ 414/789.5
4,884,938 A 12/1989 Fujita et al.
5,259,721 A 11/1993 Sato et al.
5,536,135 A 7/1996 Robertson
5,642,975 A 7/1997 Epstein (Continued)

FOREIGN PATENT DOCUMENTS

CH 677 198 4/1991

(Continued)

*Primary Examiner*—Gregory W Adams
(74) *Attorney, Agent, or Firm*—Nixon & Vanderhye P.C.

(57) ABSTRACT

A panel installation apparatus is cooperable with an aerial work platform of a lift vehicle for installation of panels on a surface. The apparatus includes a trolley movable on at least one rail supported by the aerial work platform between a displaced position spaced from the surface and engaged position adjacent the surface. The trolley is sized to support a panel to be installed. At least one mounting unit is fixed to the aerial work platform via a mounting unit frame and pivotable between a receiving position adjacent the trolley in the engaged position and an installing position adjacent the surface. The mounting unit includes at least one fixing unit selectively attachable to the panel. With the panel delivered to the mounting unit, the mounting unit can be pivoted and secured to the panel via the fixing unit, and the panel can be subsequently pivoted adjacent the surface for installation.

19 Claims, 6 Drawing Sheets

U.S. PATENT DOCUMENTS

| | | | | | |
|---|---|---|---|---|---|
| 5,752,729 | A | * | 5/1998 | Crozier et al. | 294/2 |
| 5,863,169 | A | * | 1/1999 | Inkeroinen | 414/11 |
| 5,979,212 | A | * | 11/1999 | VanderZee et al. | 72/405.09 |
| 6,010,299 | A | | 1/2000 | Jesswein | |

FOREIGN PATENT DOCUMENTS

| | | |
|---|---|---|
| DE | 299 22 223 | 4/2000 |
| EP | 1 336 702 | 8/2003 |
| FR | 2 669 361 | 5/1992 |
| GB | 2 351 116 | 12/2000 |
| GB | 2 358 012 | 7/2001 |
| GB | 2 385 313 | 8/2003 |
| JP | 3-119256 | 5/1991 |
| JP | 8-114027 | 5/1996 |
| RU | 1472403 | 4/1989 |
| WO | WO 95/25210 | 9/1995 |
| WO | WO 99/19583 | 4/1999 |

* cited by examiner

PANEL INSTALLATION APPARATUS AND METHOD

CROSS-REFERENCES TO RELATED APPLICATIONS

This application claims the benefit of U.S. Provisional Patent Application Ser. No. 60/466,425, filed Apr. 30, 2003, the entire content of which is herein incorporated by reference.

STATEMENT REGARDING FEDERALLY SPONSORED RESEARCH OR DEVELOPMENT (Not Applicable)

BACKGROUND OF THE INVENTION

The present invention relates to a panel installation apparatus and method for installing panels on a surface and, more particularly, to an apparatus and method cooperable with an aerial work platform of a lift vehicle for installation of such panels.

The use of composite roof and wall cladding panels in the construction of buildings has become more popular due to considerable benefits in terms of appearance, weather resistance, fire resistance and sound reduction. Additionally, such panels typically have very good heat insulating properties. Installation and replacement of the cladding panels, however, can be a difficult operation due particularly to the size and weight of the panels, which makes handling by workmen difficult and strenuous. The problem is exacerbated when the building size requires that the cladding panels are installed from an elevated position.

The current process is labor intensive, where an installation team has to lift heavy panels (subject to increasingly demanding health and labor regulations). In addition, when installing horizontal cladding, for example, special attention must be paid to the seal on the horizontal joint surfaces. Damage to this seal can result in leakage of both water and air between the panels. A damaged seal or more general joint area can result in a building construction being rejected on the basis of unacceptable heat escape or low quality appearance. Cladding devices on the market today can damage this seal when the panel is rotated into a vertical orientation about its lower edge. In addition, seal damage can occur if the panel needs to be slid horizontally (to achieve proper alignment) across a previously installed panel.

Construction sites often employ construction equipment for lifting large and heavy components such as the cladding panels into position for installation onto the building. An aerial lift or a boom lift including an aerial work platform may be employed that includes auxiliary material handling equipment secured to the platform for maneuvering the building materials into a location. Such an operation, however, is complicated by the fact that it is difficult to achieve an optimal height of the work platform due to difficulties in operation and fine position control. A similar situation therefore arises in which a number of workmen must support a hanging cladding panel or other construction material at some distance and height from the wall or platform safety barrier and then lift and move the material from this hanging position for installation into a final position. This methodology is strenuous on the workmen and can lead to an unsafe construction site.

Moreover, with an aerial work platform, problems may arise when working on the face of a building, especially when an aerial lift is fully extended, due to the tendency of the work platform to move by small amounts relative to any fixed structure adjacent the lift. Such a problem may occur when an operator in the lift is working against the structure, for example when drilling into the wall or cladding on a building or when placing or pushing heavy cladding panels into location.

BRIEF SUMMARY OF THE INVENTION

The panel installation apparatus and method of the invention facilitates installation of panels such as cladding panels and/or other construction materials supplied in a sheet form. The apparatus mounts onto an aerial work platform of a lift vehicle, such as a scissor lift vehicle or a boom lift vehicle. Once the panel is loaded on the apparatus, a trolley transfers it across the platform, and the panel can then be lifted and positioned in the proper orientation for installation with positioning control in four directions. Individually adjustable arms enable an additional two degrees of freedom The invention eliminates risks of seal damage and significantly reduces strenuous labor requirements, allowing for fast, high quality installation of construction panels up to significantly heavy weights. In a preferred arrangement, vacuum suction is used to hold the panels, while four (or six) degrees of freedom are available for precise positioning of the cladding, including lift, tilt and telescope, which are preferably hydraulically actuated, and side to side positioning, which is preferably manually actuated. The multi-degree of freedom positioning prevents the seal from being damaged during the installation process.

In an exemplary embodiment of the invention, a panel installation apparatus is cooperable with an aerial work platform of a lift vehicle for installation of panels on a surface. The panel installation apparatus includes a trolley, which is sized to support a panel to be installed, movable on at least one rail supported by the aerial work platform between a displaced position spaced from the surface and an engaged position adjacent the surface. At least one mounting unit is fixed to the aerial work platform via a mounting unit frame and pivotable between a receiving position adjacent the trolley in the engaged position and an installing position adjacent the surface. The mounting unit includes at least one fixing unit selectively attachable to the panel.

Preferably, the fixing units are suction cups connected to a vacuum source. A vacuum reservoir may be disposed adjacent the suction cups for storing vacuum pressure. Moreover, a vacuum switch measures vacuum pressure and communicates with a system controller. The system controller limits operation of the apparatus if the vacuum pressure is below a predetermined minimum vacuum pressure. The apparatus may also include a manifold valve separating the vacuum reservoir from the vacuum source, wherein the system controller is programmed such that upon failure of the vacuum source as detected by the vacuum switch, the manifold valve is closed to preserve vacuum in the vacuum reservoir.

An actuator such as a hydraulic cylinder may be attached between the mounting unit frame fixed to the aerial work platform and the mounting unit for driving the mounting unit between the receiving position and the installing position. With two mounting units, the hydraulic circuit is configured to drive the mounting units simultaneously. It is also desirable for the mounting units to be individually adjustable.

A stabilizer arm may be secured to the aerial work platform. The stabilizer arm is movable to engage a previous panel attached to the surface to stabilize the apparatus for installation of the panel.

In another exemplary embodiment of the invention, a method of installing panels on a surface utilizes a panel installation apparatus cooperable with an aerial work platform of a lift vehicle. The method includes the steps of supporting a panel to be installed on a trolley movable on at least one rail supported by the aerial work platform; transporting the panel on the trolley from a displaced position spaced from the surface to an engaged position adjacent the surface; securing at least one mounting unit to the panel; pivoting the mounting unit from a receiving position adjacent the trolley in the engaged position to an installing position adjacent the surface; and securing the panel to the surface.

BRIEF DESCRIPTION OF THE DRAWINGS

These and other aspects and advantages of the present invention will be described in detail with reference to the accompanying drawings, in which.

DETAILED DESCRIPTION OF THE INVENTION

Figure 1:
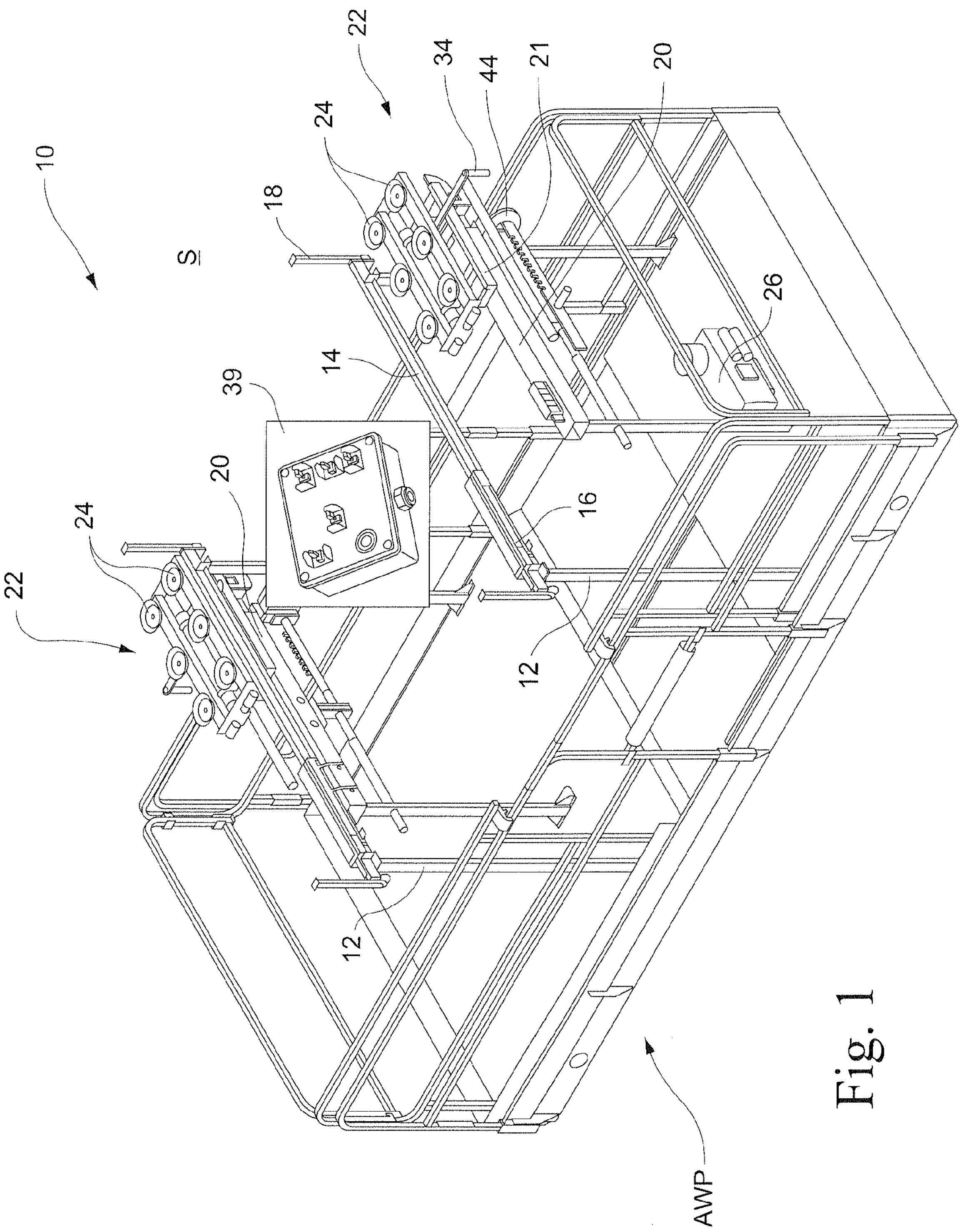
FIG. 1 is a perspective view of the panel installation apparatus.
Figure 2:
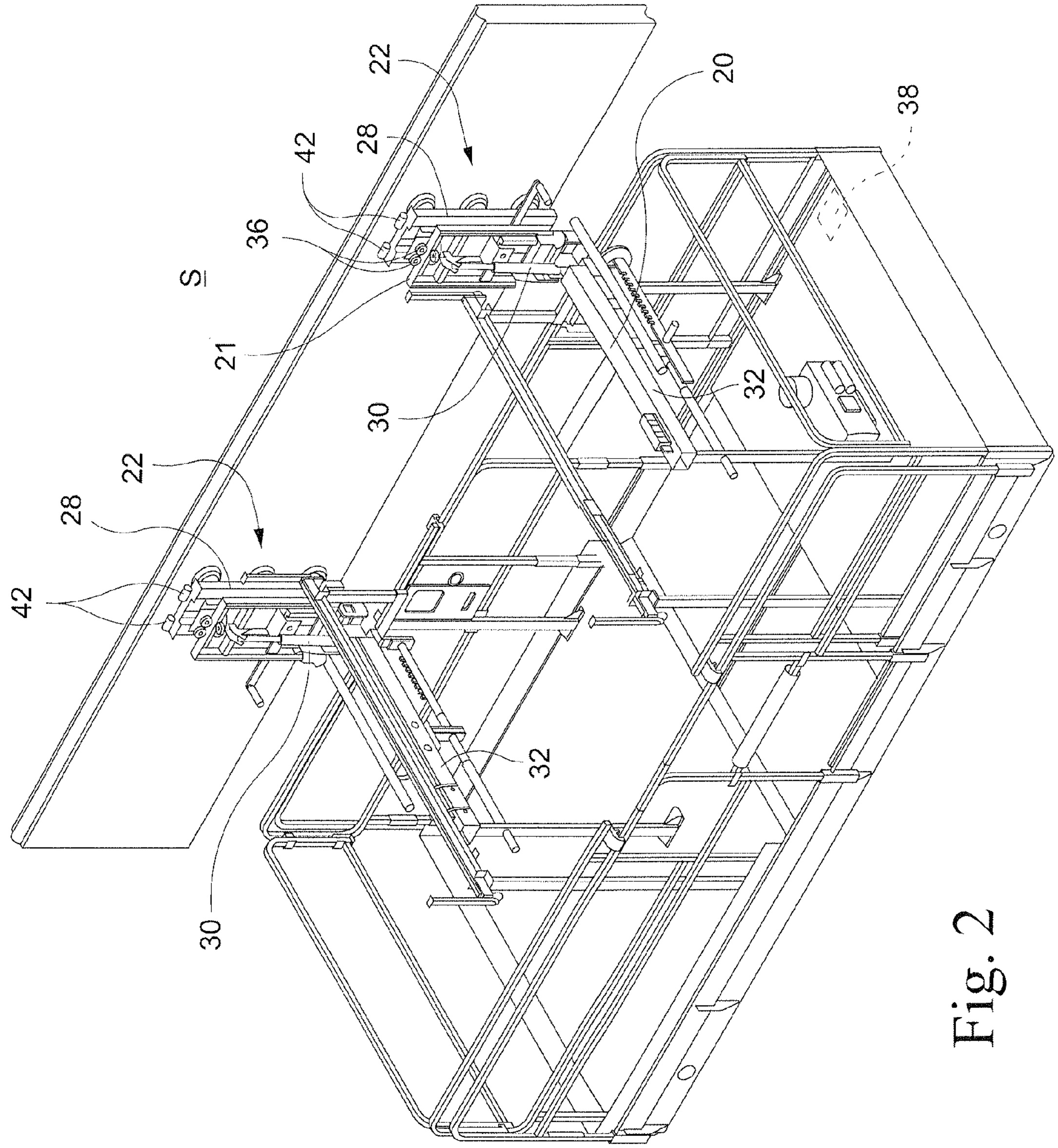
FIG. 2 is a perspective view with a panel in position for installation.
Figure 3:
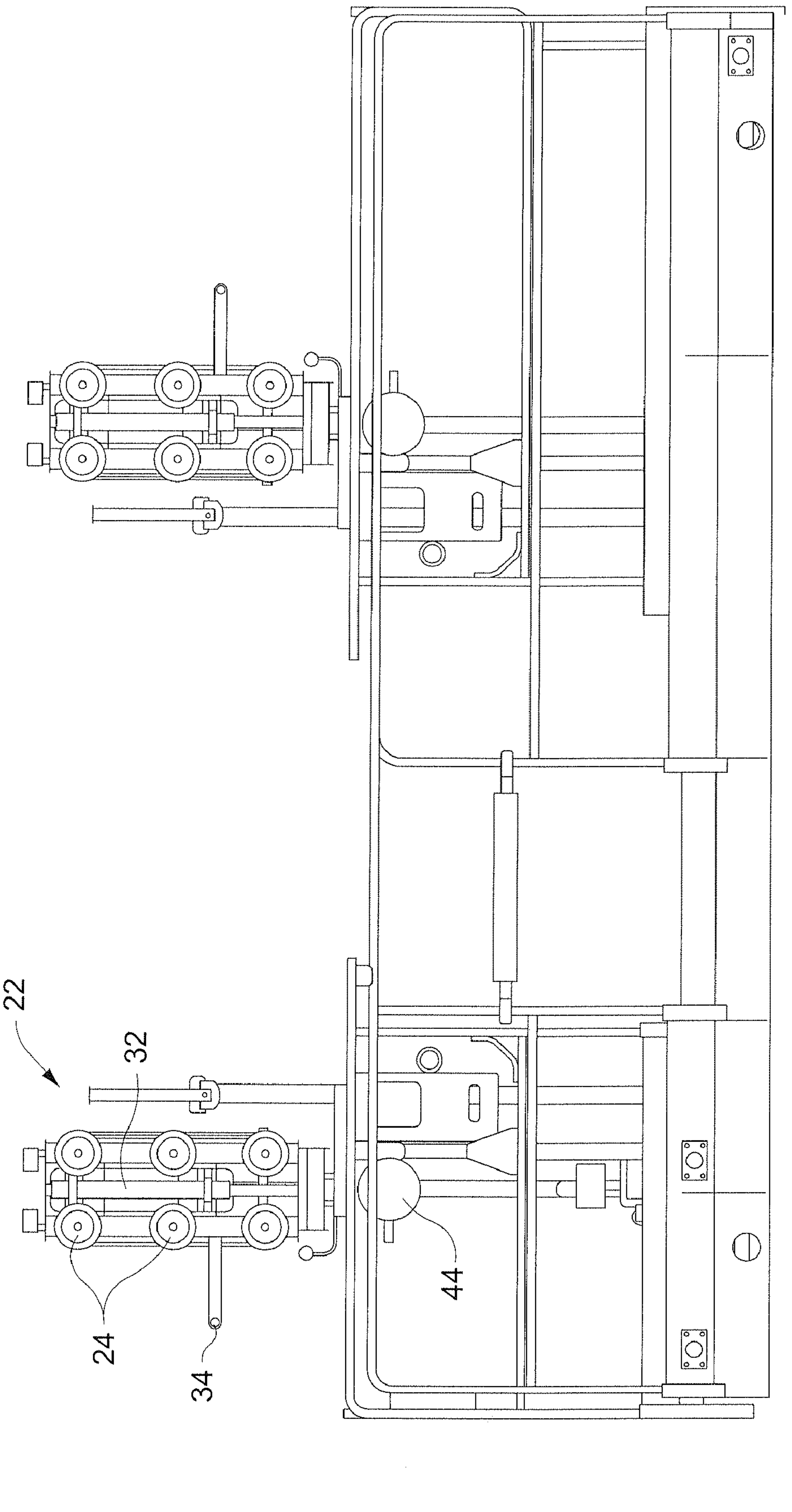
FIG. 3 is a front view of the panel installation apparatus with the mounting units raised.

With reference to FIGS. 1-3, the panel installation apparatus 10 of the present invention is cooperable with an aerial work platform AWP of a lift vehicle. The lift vehicle may be any lift vehicle suitable for the described purpose such as a scissor lift vehicle, a boom lift vehicle, etc.

The apparatus 10 includes a rail frame 12 securely fixed to the aerial work platform AWP and supporting a trolley rail 14. As shown in FIG. 1, in a preferred arrangement, the apparatus includes two rail frames 12 and trolley rails 14. A trolley 16 is movably mounted on the rail 14 for displacement between a displaced position spaced from a surface S to which the panel will be installed and an engaged position adjacent the surface S. The trolley 16 is generally sized to support the panel being installed. A retractable stop arm 18 may be fixed at a surface end of the trolley rail 14 to facilitate proper positioning of the panel with the trolley in the engaged position and to prevent the panel from falling during transport. The trolley 16 is movable on the trolley rail 14 via any suitable structure such as wheels, ball bearings, slide pads, and the like.

A mounting unit frame 20 is also secured to the aerial work platform AWP and pivotally supports a mounting unit sub-frame 21 upon which is secured a mounting unit 22. In a preferred arrangement, the apparatus 10 includes a pair of mounting unit frames 20 spaced in a width direction of the aerial work platform AWP as shown in FIGS. 1-3. The mounting unit 22 includes one or more fixing units such as suction cups 24 connected via a vacuum circuit to a vacuum source such as a vacuum pump 26 mounted to the aerial work platform AWP. As shown, each mounting unit 22 includes, for example, six suction cups 24, with the twelve total suction cups 24 separated into four independent vacuum circuits, with three suction cups 24 per circuit. Each group of three suction cups 24 is connected to a vacuum tube 28 that acts as a vacuum reservoir, storing vacuum pressure in the event of a vacuum system failure.

The mounting unit sub-frames 21 and mounting units 22 are pivotable between a receiving position as shown in FIG. 1 and an installing position adjacent the surface S as shown in FIGS. 2 and 3. In the receiving position shown in FIG. 1, the suction cups 24 are disposed generally below a horizontal plane defined by the trolley rails 14 such that when the trolley 16 carries a panel to be installed to its engaged position toward the surface S, the mounting unit 22 and suction cups 24 are disposed adjacent (beneath in FIG. 1) the panel. With reference to FIG. 2, an actuator 30, such as a hydraulic cylinder, is attached between the mounting unit frame 20 fixed to the aerial work platform AWP and the mounting unit sub-frame 21 to drive the mounting units 22 between the receiving position and the installing position-tilt function.

The mounting units 22 are preferably movable with four degrees of freedom, including lift, telescope and horizontal shift (or side-to-side positioning) and tilt as described above. In a preferred arrangement, additional actuators or hydraulic cylinders 32 are coupled with the mounting units 22 to effect hydraulic control of at least lift and telescope. In a preferred embodiment, these hydraulic cylinders 32 and the hydraulic cylinder 30 attached to the mounting unit 22 are driven via the hydraulic circuit.

The hydraulic circuit is generally configured to simultaneously drive the mounting units. The lift and telescope functions are also normally synchronous, but the simultaneous operation can be temporarily overridden for independent operation if necessary to allow for correction due to misalignment of the aerial work platform AWP with the surface S.

Side-to-side positioning of the mounting units 22 is effected manually via a lever 34, with the mounting unit 22 including a wheel assembly 36 enabling the mounting unit 22 to be moved side-to-side on the mounting unit sub-frame 21. See FIGS. 2 and 3. In an alternative configuration, an additional actuator, such as a hydraulic circuit, can be used to adjust the mounting units in the horizontal direction (i.e., along the joint).

The hydraulic hoses are preferably connected to the lift machine with quick couplers that allow for easy connect and disconnect. Hydraulic power is provided by the hydraulic system of the lift machine.

The vacuum level in the system is measured using a vacuum switch 38 communicating with a system controller 39. If a sufficient vacuum pressure is achieved in the system, an indicator light will illuminate on the control box. A limit switch mounted to each mounting unit 22 indicates whether the mounting unit 22 has been pivoted below 15° or above 15°. This exemplary angle was chosen to ensure that the panel would not fall if sufficient vacuum pressure is not present. If the mounting unit 22 is situated below 15°, all functions (lift, tilt, telescope) are fully operational regardless of the vacuum level. If there is insufficient vacuum pressure in the system, the mounting units 22 cannot be pivoted above 15°.

In the event of a failure in the vacuum system (as indicated by the vacuum switch) when the mounting units are above 15°, the indicator light will turn off, and functions that move the panel into a more unsafe position (tilt up, telescope out) are disabled. A manifold valve 42 separates each vacuum reservoir 28 from the remainder of the vacuum system. Upon failure in the vacuum system, the manifold valves 42 on each of the vacuum reservoirs 28 will close, preserving vacuum pressure in each reservoir 28. The vacuum pressure in the vacuum reservoir 28 will hold the panel for a period of time so that the operator can lower the panel into a safe position. A failure in the electrical system or vacuum pump will also cause the manifold valves 42 to close.

Figure 5:
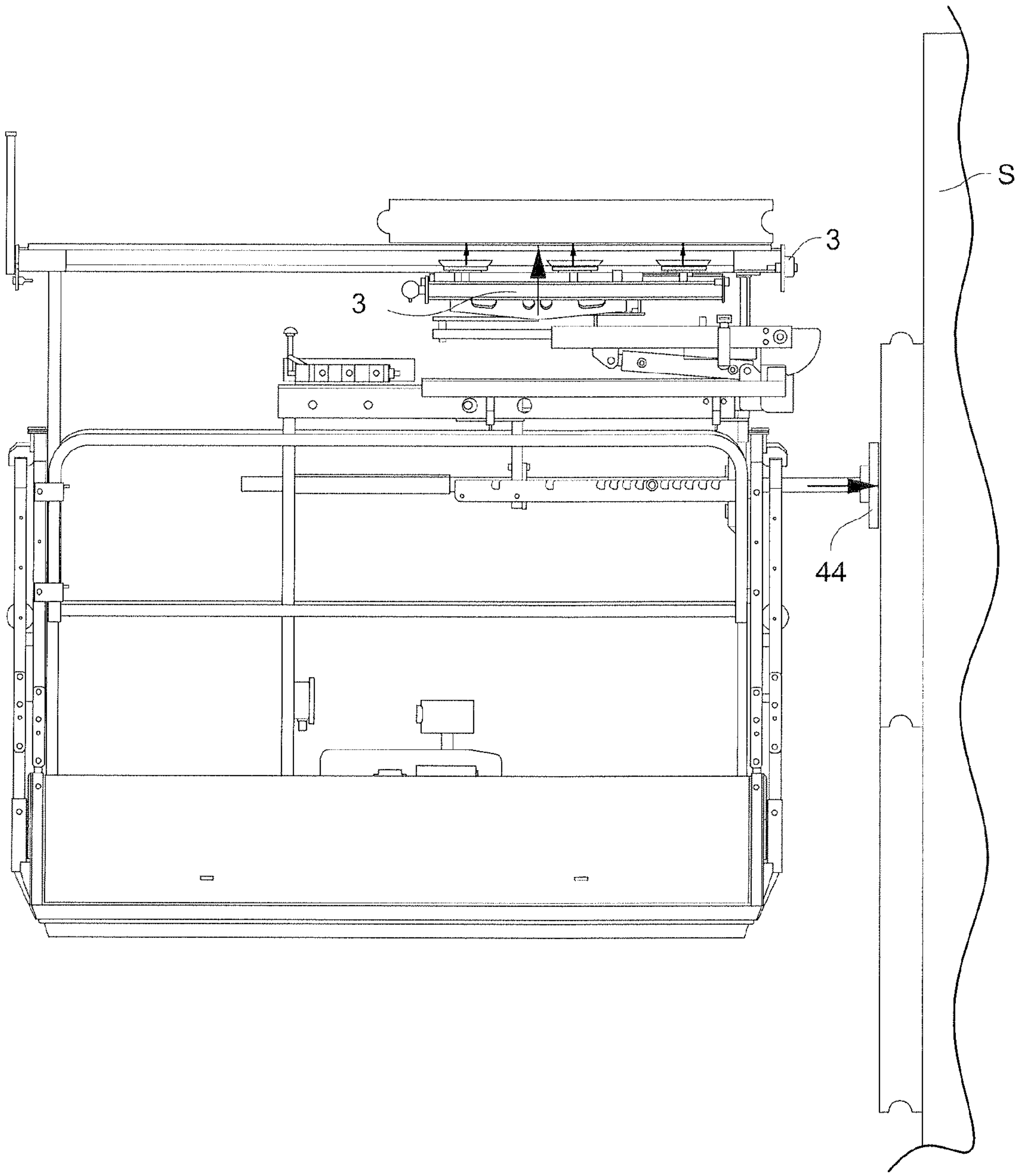

Generally, the weight of a panel attached to the mounting units and overhanging the edge of the aerial work platform AWP causes the machine's lift mechanism to lean toward the surface S. In order to stabilize the machine, the apparatus additionally includes one or more stabilizer bars 44 movably secured to the aerial work platform AWP. The stabilizer bar 44 is preferably a telescoping mechanism that is deployed by sliding an internal tube with an attached handle and then locking a handle in the cutout of a rack plate. The end of the telescoping tube is equipped with a reaction pad that presses against the wall. Preferably, as shown in FIG. 5, the stabilizer bar 44 is movable to engage a previous panel attached to the surface S to stabilize the apparatus for installation of the current panel.

In an alternative arrangement, there may be an elastic element installed in the stabilizer bar 44, such as a spring, soft rubber material, etc., which is intended to introduce a compressible member so that the reaction pad is positioned against the surface S with some preload. As a consequence, the stabilizer bar 44 can stay in contact with the surface S when the aerial work platform AWP slightly sways away from the wall. Such a configuration eliminates a potential "hammering effect" of the reaction pad moving in/out of contact with the surface S. In yet another alternative configuration, the reaction pad is replaced with an additional suction cup that attaches the stabilizer bar 44 to the previously installed panel. The connection between the stabilizer bar 44 and the pad can be stiff or flexible with compressible elements reducing but not eliminating sway of the machine in relation to the surface.

In still another alternative, a reaction pad or suction cup can be attached directly to the telescoping arm, eliminating the stabilizer bar.

Figure 4:
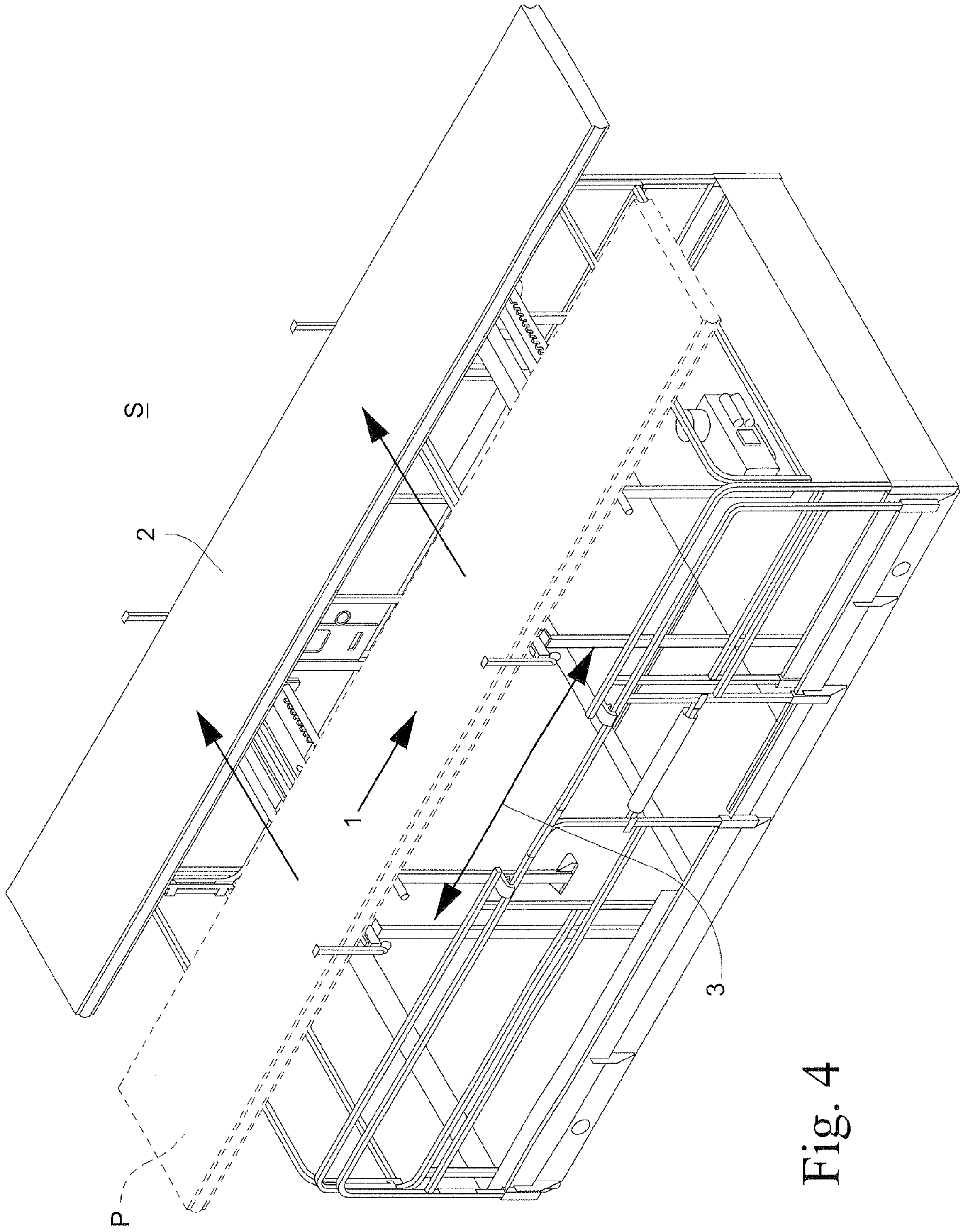
FIGS. 4-6 illustrate a method of installing a panel on a building surface.

A method for installing panels on a surface will be described with reference to FIGS. 4-6. As shown in FIG. 4, with the trolley 16 in the displaced position, a panel P is placed on the trolley 16 manually or by a telescoping forklift or the like (step 1). The panel is then transported on the trolley 16 as the trolley 16 is displaced to the engaged position adjacent the surface S (step 2). In this position, the panel P is disposed above the suction cups 24 of the mounting units 22. A distance between the mounting units 22 can be adjusted according to panel length by extending or retracting deck extensions of the aerial work platform AWP.

As shown in FIG. 5, with the stabilizer bar 44 locked in position against a previous panel, the mounting units 22 are simultaneously pivoted by the hydraulic cylinders 30 until the suction cups 24 are in contact with the panel P (step 3). If raised, the retractable stop arm 18 is retracted after the mounting units 22 secure the panel P.

Figure 6:
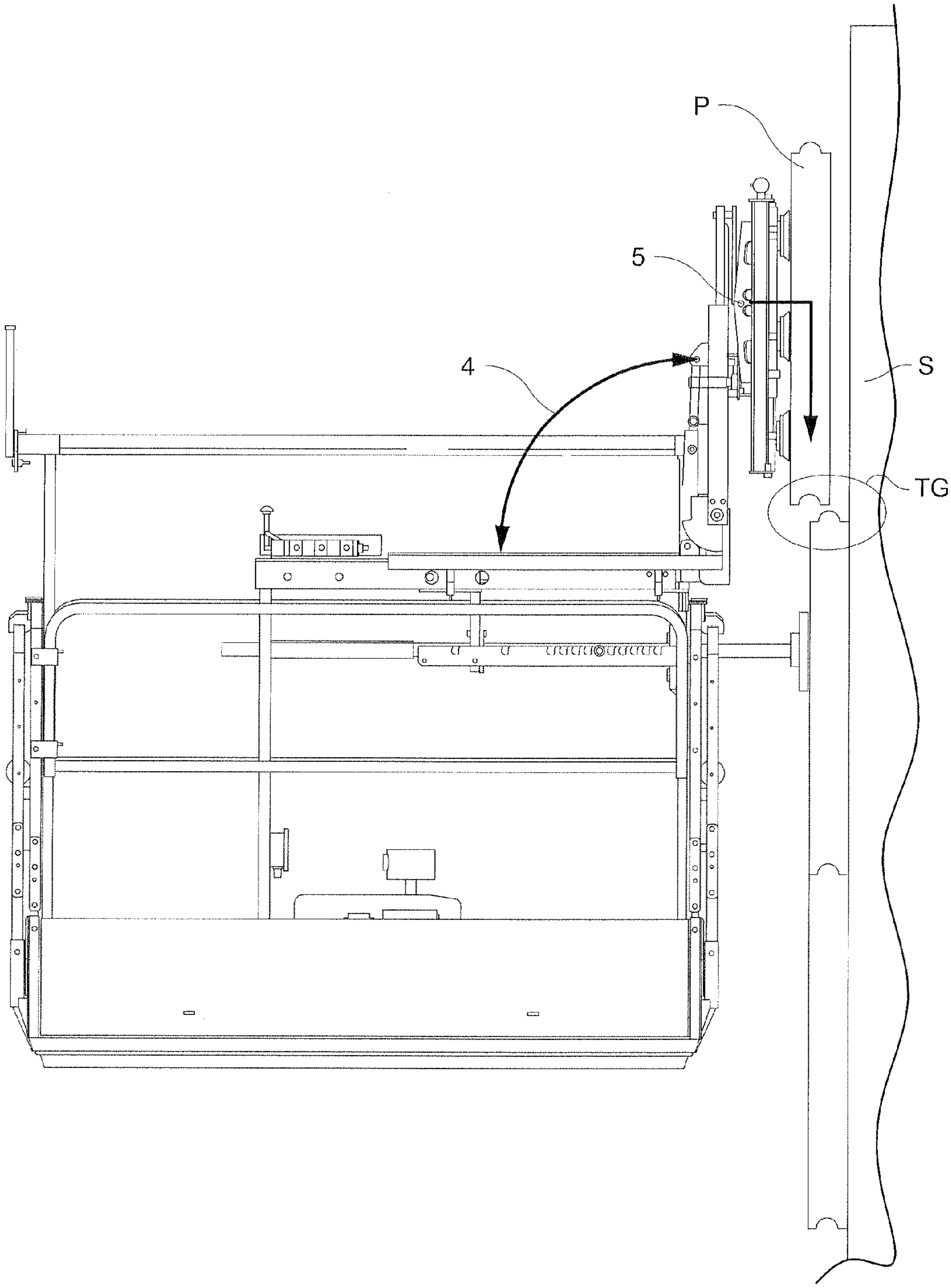

The mounting units 22 are then pivoted from their receiving position adjacent the trolley 16 in the engaged position to an installing position adjacent the surface S as shown in FIG. 6 (step 4). Subsequently, the panel P can be fine positioned by adjusting the mounting units 22 in four degrees of freedom including lift, tilt, telescope and horizontal shift to align the panel P for installation on the surface S (step 5). The ability to individually adjust lift and telescope adds an additional two degrees of freedom for the configuration having two mounting units 22 installed on the platform. In the case of exterior horizontal cladding for building construction, the cladding panels are typically provided with a tongue and groove arrangement TG to facilitate installation. With the panel P properly placed against the surface S, the panel P can then be affixed to the surface S in any suitable manner (step 6). Once the panel P is securely affixed to the surface S, the mounting units 22 and suction cups 24 are released from the panel P, the mounting units 22 are pivoted back to their receiving position, and the process is restarted for installation of the next panel.

With the apparatus and method of the present invention, installation of panels such as heavy cladding panels and the like to a surface can be facilitated, reducing or eliminating instances of seal damage and considerably reducing manual labor requirements, allowing for fast, high quality installation of heavy construction panels.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A panel installation apparatus cooperable with an aerial work platform of a lift vehicle for installation of panels on a surface, the aerial work platform being raised and lowered by the lift vehicle, the panel installation apparatus comprising:

a trolley movable on at least one rail supported by the aerial work platform of the lift vehicle between a displaced position spaced from the surface and an engaged position adjacent the surface, the trolley being sized to support a panel to be installed, wherein the at least one rail is substantially perpendicular to the surface such that the trolley is movable in a plane substantially perpendicular to the surface; and at least one mounting unit fixed to the aerial work platform via a mounting unit frame and pivotable between a receiving position adjacent and below the panel supported on the trolley in the engaged position and substantially perpendicular to the surface and an installing position adjacent and substantially parallel to the surface and at least partially above the trolley, the mounting unit including at least one fixing unit selectively attachable to the panel, wherein the trolley is movable relative to and independent of the mounting unit, and wherein the trolley is spaced from the mounting unit in the displaced position and adjacent the mounting unit in the engaged position.

2. A panel installation apparatus according to claim 1, wherein the mounting unit comprises a plurality of fixing units.

3. A panel installation apparatus according to claim 2, wherein the fixing units comprise suction cups connected to a vacuum source.

4. A panel installation apparatus according to claim 3, further comprising a vacuum reservoir adjacent the suction cups, the vacuum reservoir storing vacuum pressure.

5. A panel installation apparatus according to claim 4, further comprising a vacuum switch measuring vacuum pressure and communicating with a system controller, the system controller limiting operation of the apparatus if the vacuum pressure is below a predetermined minimum vacuum pressure.

6. A panel installation apparatus according to claim 5, further comprising a manifold valve separating the vacuum reservoir from the vacuum source, wherein the system controller is programmed such that upon failure of the vacuum source as detected by the vacuum switch, the manifold valve is closed to preserve vacuum in the vacuum reservoir.

7. A panel installation apparatus according to claim 1, further comprising an actuator attachable between the mounting unit frame fixed to the aerial work platform and the mounting unit, the actuator driving the mounting unit between the receiving position and the installing position.

8. A panel installation apparatus according to claim 7, wherein the actuator is a hydraulic cylinder.

9. A panel installation apparatus according to claim 1, comprising two mounting units spaced in a width direction of the aerial work platform, each of the mounting units comprising a respective plurality of fixing units.

10. A panel installation apparatus according to claim 9, wherein the fixing units comprise suction cups connected to a vacuum source.

11. A panel installation apparatus according to claim 9, further comprising hydraulic cylinders attachable between the mounting unit frame and each of the mounting units, respectively, the hydraulic cylinders driving the mounting units between the receiving position and the installing position.

12. A panel installation apparatus according to claim 11, wherein the hydraulic cylinders are driven via a hydraulic circuit, the hydraulic circuit being configured to drive the mounting units simultaneously.

13. A panel installation apparatus according to claim 9, wherein the mounting units are movable with four degrees of freedom including lift, tilt, telescope and horizontal shift.

14. A panel installation apparatus according to claim 13, further comprising hydraulic cylinders coupled with the mounting units to effect hydraulic control of at least lift, tilt and telescope.

15. A panel installation apparatus according to claim 14, wherein the hydraulic cylinders are driven via a hydraulic circuit, the hydraulic circuit being configured to independently simultaneously effect lift, tilt and telescope between the mounting units.

16. A panel installation apparatus according to claim 13, wherein the mounting units are individually adjustable, resulting in an additional two degrees of freedom via individual adjustment of telescope and lift.

17. A panel installation apparatus according to claim 9, wherein the mounting units are movable to effect side-to-side positioning of the panel relative to the surface.

18. A panel installation apparatus according to claim 1, further comprising a stabilizer arm secured to the aerial work platform, the stabilizer arm being movable to engage a previous panel attached to the surface to stabilize the apparatus for installation of the panel.

19. A lift vehicle comprising:

an aerial work platform; and a panel installation apparatus cooperable with the aerial work platform, wherein the panel installation apparatus comprises:

a trolley movable on at least one rail supported by the aerial work platform between a displaced position spaced from the surface and an engaged position adjacent the surface, the trolley being sized to support a panel to be installed, wherein the at least one rail is substantially perpendicular to the surface such that the trolley is movable in a plane substantially perpendicular to the surface; and at least one mounting unit fixed to the aerial work platform via a mounting unit frame and pivotable between a receiving position adjacent and below the panel supported on the trolley in the engaged position and substantially perpendicular to the surface and an installing position adjacent and substantially parallel to the surface and at least partially above the trolley, the mounting unit including at least one fixing unit selectively attachable to the panel, wherein the trolley is spaced from the mounting unit in the displaced position and adjacent the mounting unit in the engaged position.

* * * * *

UNITED STATES PATENT AND TRADEMARK OFFICE

CERTIFICATE OF CORRECTION

PATENT NO. : 7,600,959 B2
APPLICATION NO. : 10/834103
DATED : October 13, 2009
INVENTOR(S) : Neubauer et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 579 days.

Signed and Sealed this

Fifth Day of October, 2010

David J. Kappos

*Director of the United States Patent and Trademark Office*